United States Patent [19]

Diberardino et al.

[11] Patent Number: 5,437,821
[45] Date of Patent: Aug. 1, 1995

[54] PROCESS FOR MAKING CARBON-CARBON COMPOSITES BY USING ACETYLENE TERMINATED CONJUGATED SCHIFF'S BASE MONOMERS

[75] Inventors: Thomas Diberardino; Vincent J. Castelli, both of Severna Park, Md.

[73] Assignee: The United States of America as represented by the Secretary of the Navy, Washington, D.C.

[21] Appl. No.: 129,502

[22] Filed: Sep. 30, 1993

Related U.S. Application Data

[62] Division of Ser. No. 953,353, Sep. 30, 1992, abandoned.

[51] Int. Cl.$^6$ .................... C04B 35/524; B29C 43/52
[52] U.S. Cl. .................... 264/29.1; 264/29.6; 423/447.2; 423/447.7; 428/408; 526/285; 528/245
[58] Field of Search ............ 264/29.1, 29.6; 528/245; 526/285; 428/408; 423/447.2, 447.7

[56] References Cited

U.S. PATENT DOCUMENTS

| | | | |
|---|---|---|---|
| 4,178,430 | 12/1979 | Bilow | 528/245 |
| 4,180,649 | 12/1979 | Bilow et al. | 528/245 |
| 4,730,032 | 3/1988 | Rossi et al. | 526/285 |
| 5,281,672 | 1/1994 | Diberardino | 526/285 |

*Primary Examiner*—Mathieu D. Vargot
*Attorney, Agent, or Firm*—Charles D. Miller

[57] ABSTRACT

Carbon-carbon composites of acceptable shrinkage and with negligible voids are prepared in a single casting step from acetylene-terminated Schiff's base monomers by melting a selected monomer, polymerizing it within a mold to form a green casting, and heating the casting to a carbonizing temperature. Blends of monomers may be used. Graphite may be admixed with the melted monomer to form a slurry before molding. Graphite in the form of woven graphite fiber may alternatively be positioned within the mold before the melted monomer is added thereto.

2 Claims, No Drawings

PROCESS FOR MAKING CARBON-CARBON COMPOSITES BY USING ACETYLENE TERMINATED CONJUGATED SCHIFF'S BASE MONOMERS

This application is a division of application Ser. No. 07/953,353, filed Sep. 30, 1992 now abandoned.

BACKGROUND OF THE INVENTION

1. Field of the Invention

This invention relates to manufacture of carbon-carbon composites and particularly relates to aromatic conjugated imines terminated with acetylene as fillers therefor.

2. Review of the Prior Art

As described in U.S. Pat. No. 4,929,404, carbon-carbon composites are employed in making a wide variety of molded articles, such as gaskets for high-temperature and high-pressure instruments, heat-insulating materials, corrosion resistant sealing materials, brushes for electric use, X-ray monochromators, and the like. Pitch in its thin and easily pourable melted state is currently used as the filler or binder for graphite in manufacturing such composites. Because the melting point of the filler is as low as around 100° C., heating and kneading with the base material and molding can be performed relatively easily.

On the other hand, the high temperatures, up to about 1,000° C., which are required for curing the composites degrade the pitch and cause a high volume loss (shrinkage), i.e., a low yield, such as 50–60 wgt. per cent. This shrinkage requires repeated applications of the pitch and repeated thermal treatments. Additionally, when green molding with a complicated shape, complicated deformations are created due to differences in the amount of shrinkage. The manufacturing procedure is consequently time consuming and expensive, even though the pitch is a very cheap material.

According to U.S. Pat. No. 4,954,193, several polymer materials have been used to form graphite films, such as phenolformaldehyde resins, polyacrylonitrile, fibers of polyamides, poly-p-phenylene, poly-p-phenylene oxide, polyvinyl chloride, and the like. This patent discloses pressing at a pressure not lower than 4 kg/cm$_2$ and at a temperature not lower than 2200° C. of at least two films made of a polyoxadiazole, an aromatic polyimide, or an aromatic polyamide for a time sufficient to graphitize the films in an inert gas to obtain a graphite sheet or block.

U.S. Pat. No. 4,915,984 discloses the manufacture of graphite fibers and films from at least one polymer selected from the group consisting of a polyoxadiazole, polybenzothiazoles, a polybenzobisthiazole, a polybenzoxazole, a polybenzobisoxazole, poly(pyromellitic acid imide), poly-(m-phenylene isophthalic acid amide), poly(m-phenylenebenzoimidazole, poly(m-phenylenebenzobisimidazole), and a polythiazole, at a temperature of at least 1600° C. after a preliminary heat treatment at a temperature of 400–700° C., under tension, in vacuo or in an inert gas.

U.S. Pat. No. 5,057,254 teaches that carbon/carbon composites have unique properties, such as maintaining high strength and high modulus even at temperatures above 1,000° C., and also have a small coefficient of thermal expansion. This patent states that these composites are produced by heat treating carbon fibers together with a carbonizable material (matrix), such as phenol or pitch. However, pitch expands in volume during carbonization and forms voids in the matrix, so that in actual production a cycle of impregnation and carbonization is needed. Even when hot isotatic pressing (HIP) is employed, five to eight impregnation-carbonization cycles are usually needed. In this patent, an example describes the impregnation of a three-dimensional carbon fabric with a phenolic resin solution. After drying and curing at 150° C. for 1 hour and post-curing at 200° C. for 2 hours, the fabric was subjected to a carbonization treatment at 1,500° C. for 1 hour in a nitrogen atmosphere. The primary-formed product was then impregnated with a petroleum pitch and carbonized under nitrogen four times to obtain a carbon/carbon composite having a bulk density of 1.75 g/cm$^3$ and a void percentage of 7 vol.%.

There is consequently a need for a process that can provide valuable carbon-carbon composites by employing a minimum of processing steps while expending a minimum of time, labor, and energy.

Schiff's bases having an aromatic backbone, particularly as isomers of acetylene terminated prepolymers, have been developed to replace metals under harsh environmental applications and especially as electrically conductive polymers, as described by Rossi et al in "New Processable Acetylene Functional Schiff's Base Monomers and Oligomers. Study of Their Thermal and Electrical Properties", ANTEC '88 and in "Acetylene Functional Precursors for New Intrinsically Conductive Polymers", International SAMPE Technical Conference Series, Volume #18, Oct. 7–9, 1986, Seattle, Wash.

These prepolymers show clean, distinct melting points and begin to polymerize immediately after melting as the temperature is increased, producing a very energetic exotherm. Heating must consequently be gradual and carefully controlled in order to maintain a useful processing window between the temperatures of melting and exothermic cure. Polymerization is typically conducted at 150–300° C., without loss of carbon, hydrogen, or nitrogen. The polymer is nonconductive. To obtain conductivity, the polymer is subjected under an inert atmosphere to high temperature processing (300–900° C.) and then cooled in a furnace at heating and cooling rates of approximately 0.5° C./min. Up to about 600° C., the higher the postprocessing temperature, the higher the conductivity that is imparted to the cured and heat treated polymer.

The following Schiff's base monomers, hereinafter identified as dialdehyde-derived monomers, may be prepared from aromatic dialdehydes and aromatic acetylene functional monoamines:

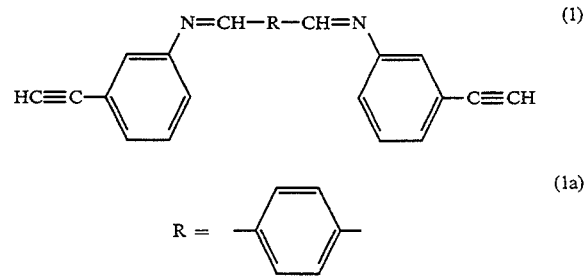

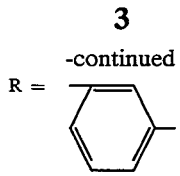
(1b)

The following analogous Schiff's base monomers, hereinafter identified as diamine-derived monomers, may also be prepared from aromatic diamines and acetylene functional aromatic monoaldehydes:

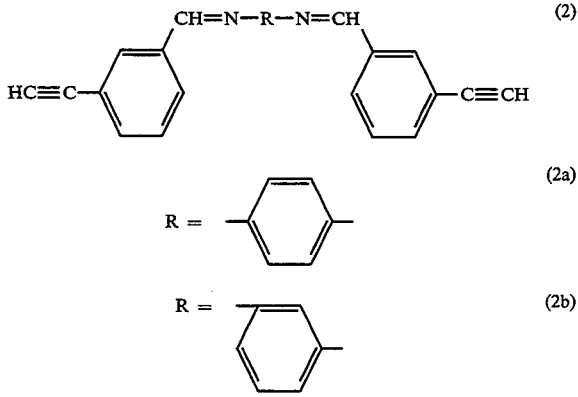

The diamine-derived monomers (2) all show poorer thermal stability than the dialdehyde-derived monomers (1). As discussed by Walton in "A Processable Prepolymer for the Preparation of a Stable Conductive Polymer", Journal of Applied Polymer Science, Vol. 37, 1921–1929 (1989), for a meta-para-meta (mpm) isomer and a meta-meta-meta (mmm or all meta) isomer, weight losses over 100 hours at 600° C. are about 13%. To approximately 450° C., the weight loss of 2–3% is mostly absorbed water. The mpm prepolymer melts at 139° or 150° C., depending on the polymorphic structure obtained in its synthesis or recrystallization. Since the cure of the polymer begins immediately after melting and produces a very energetic exotherm (783 J/g, 62.2 kcal/m) that peaks at approximately 210° C., care must be taken to ensure that the temperature does not increase above 160–165° C. during the first hour of the cure. The melting point of the all meta isomer, 87° C., is well below the initiation temperature for polymerization. Thus, the material can be kept in the liquid state at 120° C. for prolonged periods without concern for solidification by polymerization or recrystallization. Based on differential scanning calorimetry curves, the polymerization is initiated at approximately 139° C. for the mmm and mpm isomers. However, the heat of polymerization of the all meta isomer, 673 J/g (53.5 kcal/mol), appears to be approximately 110 J/g less than the mpm isomer, and the exotherm maximum occurs approximately 9° C. higher at 219° C. These modified properties associated with the all meta isomer greatly improve the processing of the acetylene-terminated prepolymer.

The mpm isomer, however, is pecular in its melting behavior in that it exists as two distinct crystalline forms with a 10° C. difference in melting points.

U.S. Pat. No. 4,178,430 states that acetylene-substituted Schiff's bases can be made very easily, usually have low melting points prior to cure, can polymerize through a tacky viscous state, and can produce partially and fully conjugated polymeric products. A product having the mpm structure shown at (1a) and melting at 136–139° C. required 60 minutes to polymerize to the tacky state and 80 minutes to reach the resinous state when heated to 160° C., but at 180° C. only 23 minutes and 30 minutes Were needed, respectively.

U.S. Pat. No. 4,180,649 relates to synthesizing homopolymerizable acetylene-terminated tetraimines by reacting a diamine with two moles of a dicarboxaldehyde to form an aldehyde terminated diimine intermediate product which then reacts with two moles of an acetylene-substituted mono amine. The amorphous solid produced by reacting one mole of 1,3-bis(3-aminophenoxy)benzene, two moles of isophthalaldehyde, and two moles of 3-aminophenylacetylene was found to yield a very tough resin having a degradation temperature of over 350° C. and making a good lacquer and an excellent laminating resin.

SUMMARY OF THE INVENTION

It is accordingly an object of this invention to provide a process for manufacturing carbon-carbon composites in which the composites are formed and cured in a single step.

It is another object to provide a composition of low viscosity when melted that is useful as a filler and substitute for pitch for manufacturing carbon-carbon composites.

It is a further object to provide a composition as a filler for manufacturing carbon-carbon composites that is subject to such low loss in weight and volume that a single casting is sufficient.

It is an additional object to provide a composition, having components with selected structures and molecular weight and in the form of a b-stage resin, that has a selected viscosity suitable for pressure molding in the manufacture of carbon-carbon composites.

In accordance with these objects and the principles of this invention, compounds for manufacturing carbon-carbon composites are herein provided that have low loss in weight and volume while being heated at carbonizing temperatures. These compounds are conjugated aromatic Schiff's base monomers. They comprise at least three aromatic rings, the middle ring being joined to the outer rings by the imine groups and both outer rings being terminated by acetylene groups. Aromatic substitution is preferably in the all-meta position which results in a low melting point and an extended processing window between the onset of endothermic transition and the onset of exothermic transition. However, any combination of meta and para substitution can be used as long as the material can be melted below the reaction temperature. The compounds can also be used as oligomers at a selected viscosity and degree of polymerization.

The all-para substituted compound does not melt before reaction occurs, so that it is only marginally suitable for making carbon-carbon composites. The monomers having relatively short processing windows are most suitably handled by melting within the mold and by very slowly heating to the onset temperature of exothermic transition.

The process of this invention for making a carbon-carbon composite, in which carbonizing causes a sufficiently low weight loss that a single casting is acceptable, accordingly comprises:

A. melting a conjugated aromatic Schiff's base monomer;

B. pouring the melted monomer into a mold;

C. heating the mold to the approximate onset temperature of exothermic transition and maintaining that temperature while polymerization proceeds to completion, thereby forming a green casting;

D. heating the casting to a carbonizing temperature; and

E. continuing the heating at the carbonizing temperature until the carbon-carbon composite is formed.

The green casting may be removed from the mold before carbonizing is begun. Furthermore, the green casting may be readily machined if inspection shows a need therefor. Volumetric shrinkage is slight, but additional monomer may be added to the green casting if necessary, followed by another step C. The finished carbon-carbon composite is very hard and has a mirror-smooth, shiny surface.

DESCRIPTION OF THE PREFERRED EMBODIMENTS

The compounds synthesized from meta substituted amino-phenyl acetylenes (1), yielding fully conjugated monomers or oligomers in which each double or triple bond is attached to a single bond which in turn is attached to another double or triple bond, are preferred for the purposes of this invention. The mmm or all-meta compounds (1b) are particularly preferred. Compounds of this type, having a para linkage across all of the phenyl groups, have been generally found to have too short a processing window between the time of ending the melt and the time of beginning the polymerization exotherm because it is necessary to maintain the liquid state for an appreciable length of time between melting and polymerization as a practical matter. Compounds that are useful for the purposes of this invention have the following general formula:

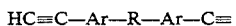  (3)

where R may be:

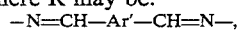  (4)

  (5)

and

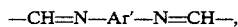  (6)

and Ar' is phenylene, biphenylene, naphthalene, anthracene, phenanthrene, pyrene, alkyl or aryl substituted phenylene, alkyl or aryl substituted biphenylene, alkyl or aryl substituted naphthalene, and heterocyclic analogues of the above wherein one or more of the aromatic carbon atoms is replaced by a nitrogen or sulfur atom. In addition, the following bis-substituents as Ar or Ar' in compounds (4), (5), and (6) are suitable:

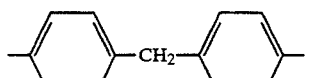  (c)

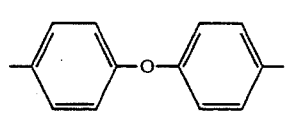  (d)

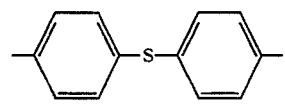  (e)

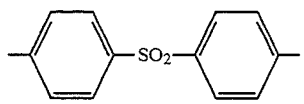  (f)

The invention may be more fully understood by consideration of the following examples.

EXAMPLE 1

A 1-liter autoclave is preheated to the melting point, 85° C., of the acetylene-terminated Schiff's base monomer (1b), and 500 g of this material are added. After 30 minutes with stirring, 400 g of vacuum dried (150° C. for 2 hours) flake type graphite are added. Stirring is continued for 10 minutes. The slurry is then poured out of the autoclave into a mold which is placed in an oven heated at 85° C. The mold temperature is slowly raised to 150° C. After one hour, the temperature is slowly raised to 200° C. and held for one hour. The green casting is removed from the mold and put into a furnace and further heated to 250° C. for two hours, and then is still further heated to 300° C. for 5 hours. Then the green casting is removed from the mold and put in a furnace with an inert atmosphere and heated at 400° C. for 24 hours. The casting is removed from the furnace and cooled to room temperature. The casting is found to have a volume shrinkage of about 2.5%, measured from the mold dimensions, and an apparent bulk density of 1.45 g/cm³.

EXAMPLE 2

A steel mold is prepared to produce a piston head and skirt for an automobile engine. The piston head is 2.5 inches in diameter, and the skirt is one inch in length. Three layers of a woven mat of rayon-based carbon fibers are placed within the head portion of the mold, and a single layer of the woven carbon fibers is placed within the skirt portion thereof. The mold is preheated to 145° C. The mpm diamine-derived and acetylene-terminated Schiff's base isomer (2a) is selected, and 200 g of this isomer are melted at 140° C. and poured into the mold until it is completely filled. The mold is placed in an oven which is maintained at 150° C. The oven is heated at a rate of 0.5° C./min. to 200° C. and held at this temperature for one hour, then at 250° C. for 2 hours, and at 300° C. for 5 hours. The mold is removed from the oven and allowed to cool. The green casting is removed from the mold and inspected. It is free from cracks and voids. Its apparent bulk density is 2.11 g/cm³. Its weight loss is 2.1%. The casting is placed in a furnace which is heated at a rate of 5° C./min. to 600° C. and held at this temperature overnight. The casting is removed from the furnace and cooled to room temperature. The casting is found to be completely free from cracks and voids and has an apparent bulk density of 1.99 g/cm³. Its weight loss from the resinous state is 14.9%. Its shrinkage matches closely to the volume shrinkage for which the mold was designed.

EXAMPLE 3

A steel mold is built for making a rocket nozzle with an interior diameter of 3.0 inches. A woven graphite mat is folded and refolded into a cone shape and carefully positioned within the mold which is then preheated to 139° C. The dialdehyde-derived, mpm Schiff's base (1a), as the high melting form which melts at 150°

C., is selected and gradually added as a powder to the mold as it melts and surrounds the mat. The steel mold is raised in temperature at 0.5° C./min. to 155° C., held at this temperature for one-half hour, dropped in temperature to 140°–145° C., and held there for 3 hours to form a b-stage resin. The mold and its contents are then slowly raised in temperature to 150° C. in an oven and held there for 1 hour. The mold is inspected, a small amount of the same Schiff's base is added as a melt, the mold is held at 150° C. for an additional hour, and the mold is closed The oven temperature is slowly raised to 200° C. held for 2 hours, slowly raised to 250° C., held for 3 hours, slowly raised to 300° C., and held overnight. The mold is then removed from the oven and allowed to reach room temperature. The green casting is removed from the mold and inspected. It is carefully machined to remove a few surface imperfections, placed in an inert-atmosphere furnace which is raised to 400° C., held for 3 hours, raised to 550° C., held for 3 hours, raised to 700° C., and held overnight. The temperature is finally raised to 900° C. and held there for 25 hours. The casting is removed from the furnace and allowed to cool Its weight loss is 14% and its volumetric shrinkage is very close to the design amount. The casting is mirror smooth and very hard.

These examples demonstrate that the acetylene-terminated, aromatic, conjugated Schiff's base monomers of this invention have the capability of being formed into a green, resinous casting without use of high pressure and of being cured to form a carbon-carbon composite in a simple, one-step operation with acceptable weight loss and shrinkage and negligible void and/or crack formation, even when using complicated molds.

What is claimed is:

1. A process for manufacturing a carbon-carbon composite rocket nozzle in a single casting , comprising
    A. placing a woven mat of graphite fibers within a mold which is in the shape of the rocket nozzle;
    B. adding to the mold an acetylene-terminated, aromatic, conjugated Schiff's base monomer of the formula HC≡C-Ar-R-Ar-C≡CH wherein R is selected form the group consisting of -N=CH-Ar'-CH=N-,-N=CH-, and -CH=N-Ar'-N=CH-, wherein Ar and Ar"are independently selected from the group consisting of phenylene, biphenylene, naphthalene, anthracene, phenanthrene, pyrene, alkyl, or aryl substituted phenylene, alkyl or aryl substituted naphthylene, and heterocyclic analogues of the above, and wherein linkages across the phenyl groups are selected from the group consisting of meta-meta-meta, meta-para-meta, and para-meta-para linkages;
    C. slowly raising the temperature of the mold to the melting point of the selected monomer and maintaining the temperature for sufficient time for all of the monomer to be melted;
    D. slowly raising the temperature of the mold to a temperature slightly below the exothermic transition temperature and maintaining the temperature for a sufficient time for polymerization of the monomer to be completed, thereby forming a green casting in the shape of the rocket nozzle; and
    E. slowly raising the temperature of the green casting to a carbonizing temperature in at least one step and maintaining the carbonizing temperature for a sufficient time for complete carbonization of the casting to form the carbon-carbon composite rocket nozzle.

2. A process for manufacturing a carbon-carbon composite piston head and skirt in a single casting, comprising
    A. placing a woven mat of graphite fibers within a mold which is in the shape of the piston head and skirt;
    B. adding to the mold an acetylene-terminated, aromatic, conjugated Schiff's base monomer of the formula HC≡C-Ar-R-Ar-C≡CH where R is selected form the group consisting of -N=CH-Ar'-CH=N-, -N=CH-, and -CH=N-Ar'-N=CH-, wherein Ar and Ar"are independently selected from the group consisting of phenylene, biphenylene, naphthalene, anthracene, phenanthrene, pyrene, alkyl, or aryl substituted phenylene, alkyl or aryl substituted naphthylene, and heterocyclic analogues of the above, and wherein linkages across the phenyl groups are selected from the group consisting of meta-meta-meta, meta-para-meta, and para-meta-para linkages;
    C. slowly raising the temperature of the mold to the melting point of the selected monomer and maintaining the temperature for sufficient time for all of the monomer to be melted;
    D. slowly raising the temperature of the mold to a temperature slightly below the exothermic transition temperature and maintaining the temperature for a sufficient time for polymerization of the monomer to be completed, thereby forming a green casting in the shape of the piston head and skirt; and
    E. slowly raising the temperature of the green casting to a carbonizing temperature in at least one step and maintaining the carbonizing temperature for a sufficient time for complete carbonization of the casting to form the product carbon-carbon composite piston head and skirt.

* * * * *